United States Patent [19]
Houryu

[11] 4,065,764
[45] Dec. 27, 1977

[54] LIQUID CRYSTAL DISPLAY DEVICE
[75] Inventor: Sakae Houryu, Yokohama, Japan
[73] Assignee: Canon Kabushiki Kaisha, Tokyo, Japan
[21] Appl. No.: 637,027
[22] Filed: Dec. 2, 1975
[30] Foreign Application Priority Data
    Dec. 3, 1974    Japan ................. 49-139227
[51] Int. Cl.² ............................. G09F 9/32
[52] U.S. Cl. .......................... 340/324 M; 340/336; 350/160 LC
[58] Field of Search ............ 340/324 M, 336; 350/160 LC

[56] References Cited
U.S. PATENT DOCUMENTS

| | | | |
|---|---|---|---|
| 3,723,749 | 3/1973 | Shapiro | 340/324 M |
| 3,787,834 | 1/1974 | Elliott | 340/324 M |
| 3,863,221 | 1/1975 | Kaji | 340/324 M |
| 3,868,674 | 2/1975 | Lorteije | 340/324 M |
| 3,936,676 | 2/1976 | Fujita | 340/324 M |
| 3,936,815 | 2/1976 | Kogure | 340/324 M |

Primary Examiner—Marshall M. Curtis
Attorney, Agent, or Firm—Fitzpatrick, Cella, Harper & Scinto

[57] ABSTRACT

A liquid crystal display device is disclosed which comprises a plurality of groups of segment electrodes formed on a first plate for energization to define digits each having a seven bar format, and a plurality of groups of digit electrode elements opposed to respective groups of the segment electrodes being formed on a second plate opposed to the first plate. The digit electrode elements are driven by respective driving elements which are in turn selected by a digit pulse generator. There are provided means for altering the polarity of the driving voltage generated from the output of the driving elements.

2 Claims, 14 Drawing Figures

FIG. 12

LIQUID CRYSTAL DISPLAY DEVICE

BACKGROUND OF THE INVENTION

1. Field of the Invention

This invention relates to a liquid crystal display device.

2. Description of the Prior Art

Figure 1:
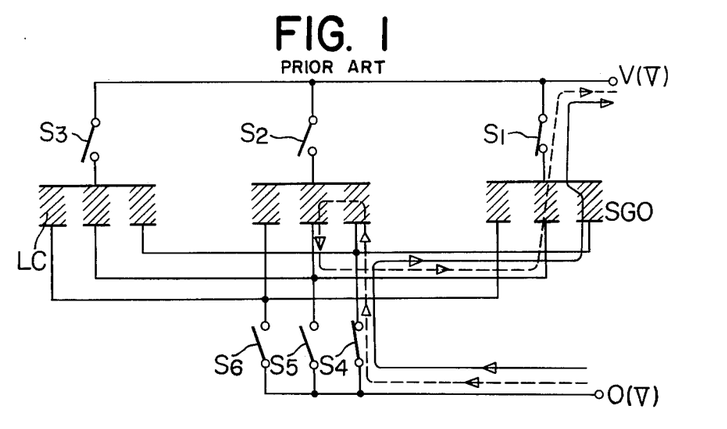
FIGS. 1, 2 and 9A show the prior art device.
Figure 2:
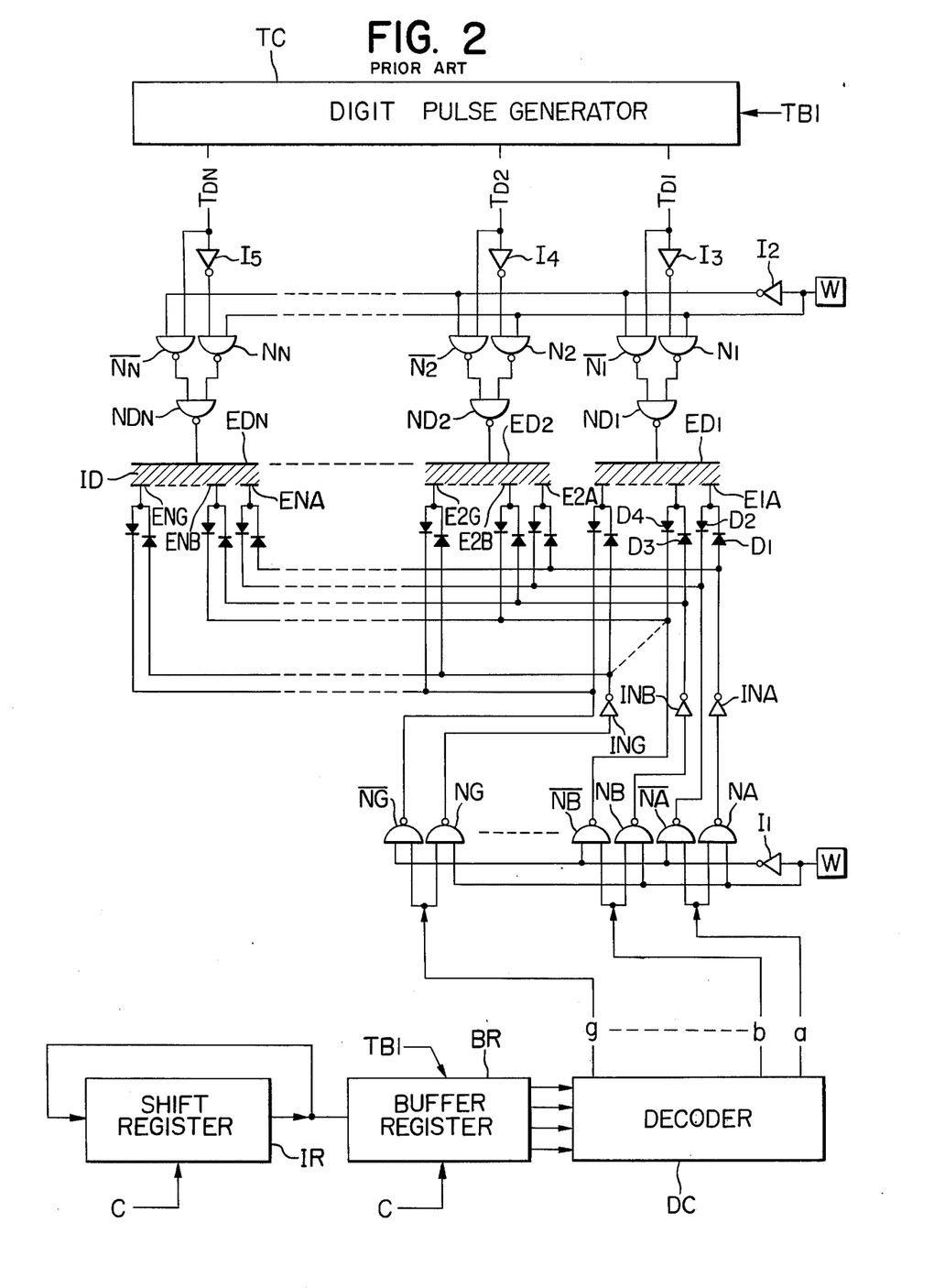
Figure 9:
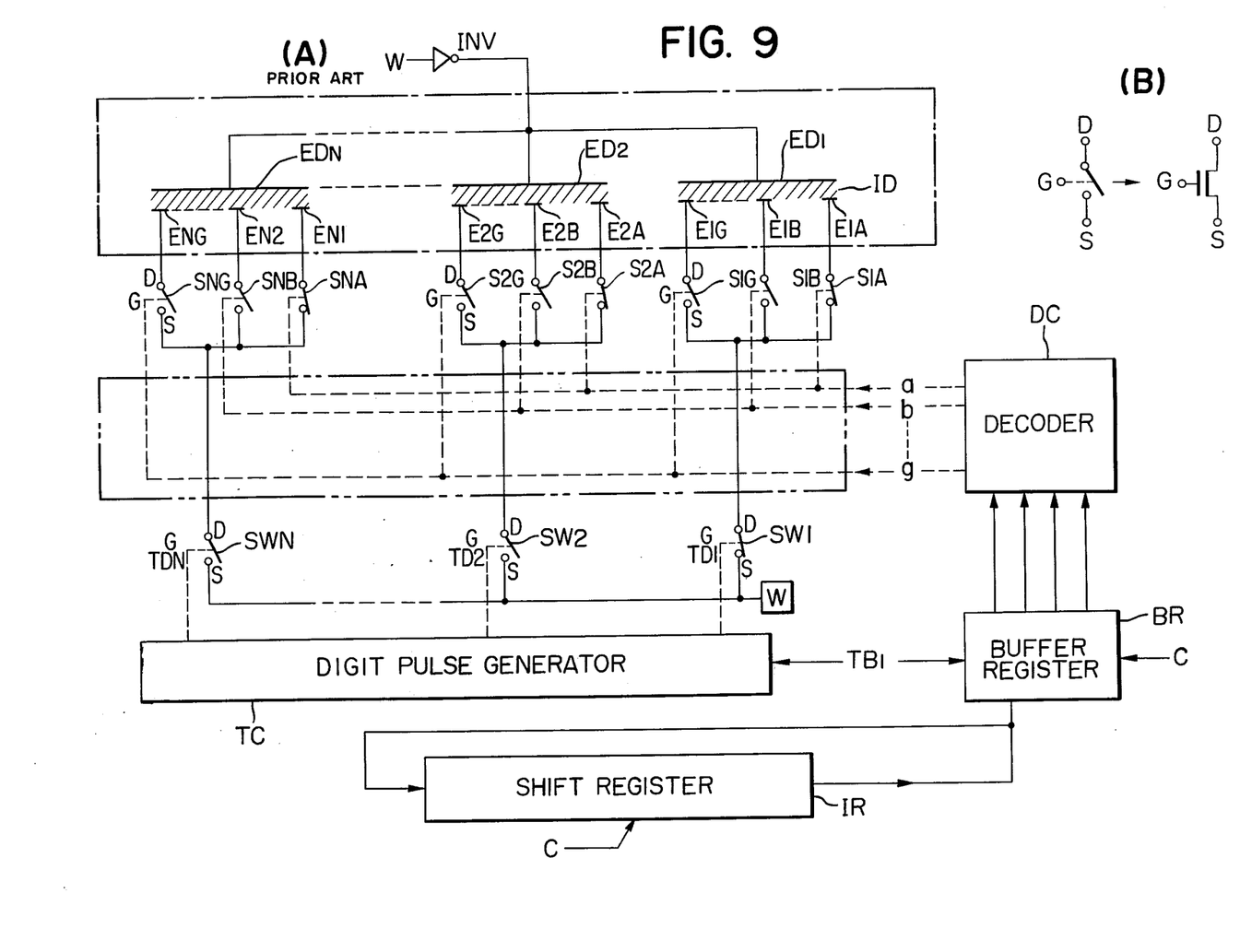
FIG. 9B shows an example of the construction in which switches comprise MOS transistors.

For the driving of a liquid crystal display device, adoption of a time division driving system will come to mind because of its economical advantage in that the driving circuit can be reduced. If, however, the liquid crystal display device is driven by a circuit as shown in FIG. 1, electric current will flow in the manner as indicated by the dotted line, due to the liquid crystal being electrically bilateral, so that there will occur crosstalk which will cause unselected segments to be turned on weakly, thus making the displayed numerals difficult to visually perceive. In the past, therefore, there has been considered a circuit as shown in FIGS. 2 and 9A of the accompanying drawings wherein a driving element for each numeric segment is inserted to prevent occurrence of crosstalk. In such circuit, however, an effort to form the driving element portion into an integrated circuit and mount the IC on a printed board has involved the necessity that the driving elements connected to a similar segment of each digit be connected in a matrix fashion as indicated within the two-dot chain line in FIG. 9A, and this has unavoidably led to the need to use a doublesided printed board. This has in turn increased the number of connections between the upper and lower patterns on the printed board, which has not only resulted in poor reliability of the device but also the space ratio of the matrix portion to the entire device has become appreciable as calculators or the like have become smaller in size.

SUMMARY OF THE INVENTION

The present invention divides a digit electrode into segments and connects a driving element to each of the segments to thereby prevent occurrence of crosstalk and greatly reduce not only the number of connections on a printed board but also the number of pins in the driving element portion IC. Accordingly, the reliability of calculators or display devices in which the invention is incorporated is enhanced, and the driving element portion is made easier to mount on the printed board.

According to the present invention, there is provided a liquid crystal display device which comprises mutually insulated numeric segment electrodes for forming numeric characters, liquid crystal, and mutually insulated digit segment electrodes opposed to the numeric segment electrodes with the liquid crystal interposed therebetween, switching elements connected to the digit segment electrodes, and a driving circuit operable in accordance with digit signals and numeric signals.

The driving elements may comprise MOS transistors or glass semiconductors.

The invention will become more fully apparent from the following detailed description of some embodiments thereof taken in conjunction with the accompanying drawings.

BRIEF DESCRIPTION OF THE DRAWINGS

FIGS. 8 and 8b illustrate the effectiveness of the present invention.

DESCRIPTION OF THE PREFERRED EMBODIMENTS

Figure 4:
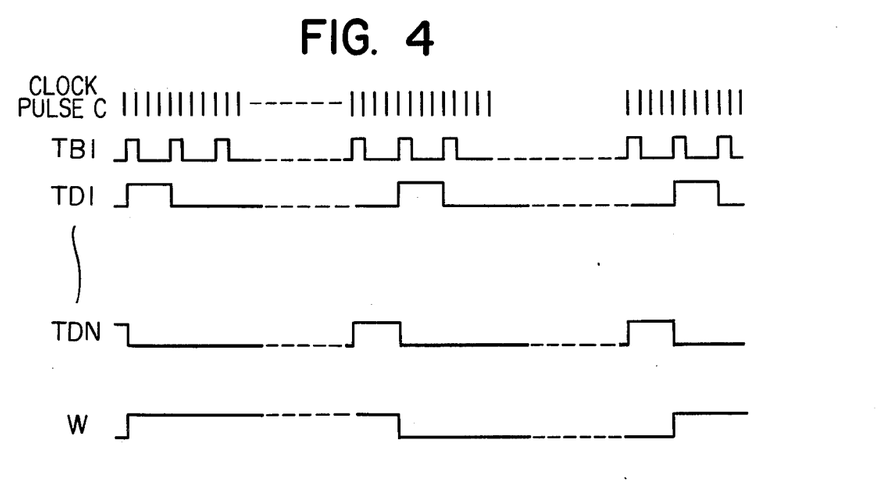
FIGS. 4 and 5 illustrate the operation of the circuit according to the prior art.

Reference will first be had to FIG 2. to describe the prior art construction. There is being produced such timing as shown in FIG. 4, wherein W represents the time during which a data makes one round within a register. When four bits corresponding to one digit are read into a buffer register BR, the data within the shift register IR is set into a static register by a signal TB1 which is produced at the end of each digit and the signals therefrom are delivered into a decoder DC, which then sends out segment signals $a, b, \ldots, g$. In the meantime, a digit counter TC advances one increment for each TB1 and sends out signals TD1, ..., TDN. Description will now be made of a case where $N=8$ and segments $a$ of the first, second and fifth digits are selected.

Figure 5:
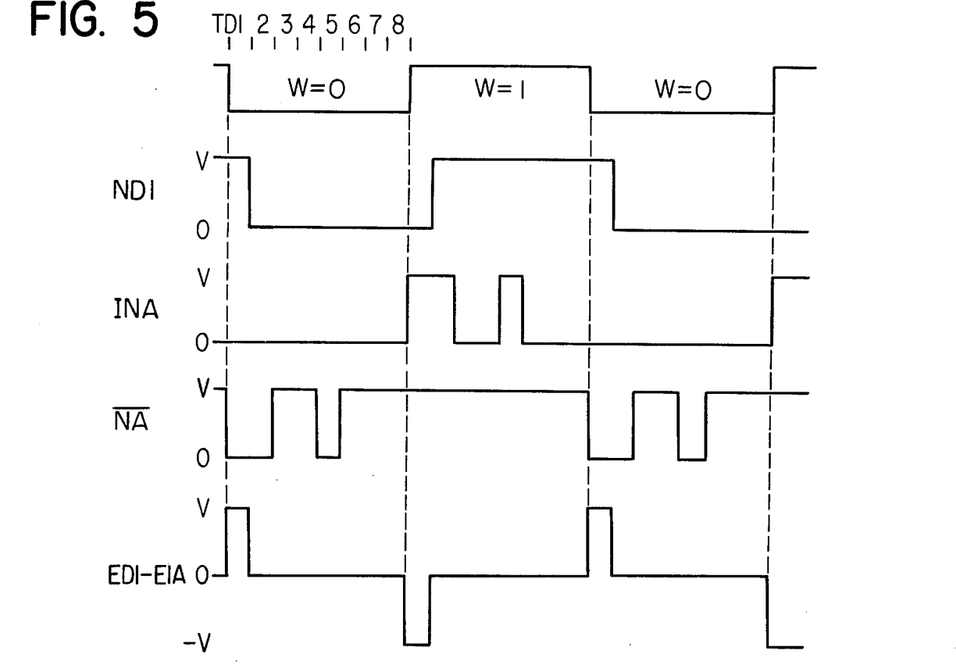

The outputs of NAND gates ND1, $\overline{NA}$ and inverter INA will be as shown below and as depicted in FIG. 5. It is known that AC drive is desirable with, taking the service life of liquid crystal into account, and W is the signal for converting the voltage applied to the liquid crystal into an alternating current.

|  | Output of NAND gate ND1 | |
|---|---|---|
|  | W = 0 | W = 1 |
| TD1 = 0 | O volt | V |
| 1 | V volt | O |
|  | Output of inverter INA | |
|  | W = 0 | W = 1 |
| a = 0 | O | O |
| 1 | O | V |
|  | Output of NAND gate $\overline{NA}$ | |
|  | W = 0 | W = 1 |
| a = 0 | V | V |
| 1 | O | V |

(Outputs of NAND gates ND2 and ND5 are similar to the output of ND1.)

It will be seen in FIG. 2 that when the output of the inverter INA is 0 volts, there is no voltage applied between digit electrode ED1 and segment electrode E1A due to the presence of an inserted diode D1, even if the output of the NAND gate ND1 is either 0 or V volts. Also, when the output of the NAND gate $\overline{NA}$ is V volts, there is no voltage applied between the electrodes ED1 and E1A due to the presence of an inserted diode D2, even if the output of the NAND gate ND1 is either 0 or V volts. A potential difference between the electrodes ED1 and E1A does occur when the output of the inverter INA is V volt and the output of the NAND gate ND1 is 0 volt or when the output of the NAND gate $\overline{NA}$ is 0 volt and the output of the NAND gate ND1 is V volt. Accordingly, the voltage applied between the electrodes ED1 and E1A will be as shown in FIG. 5.

Embodiment 1

Figure 3:
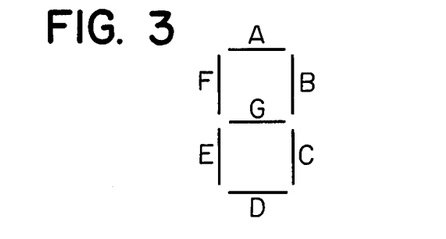
FIG. 3 shows an example of the construction of a digit electrode according to the present invention.
Figure 6:
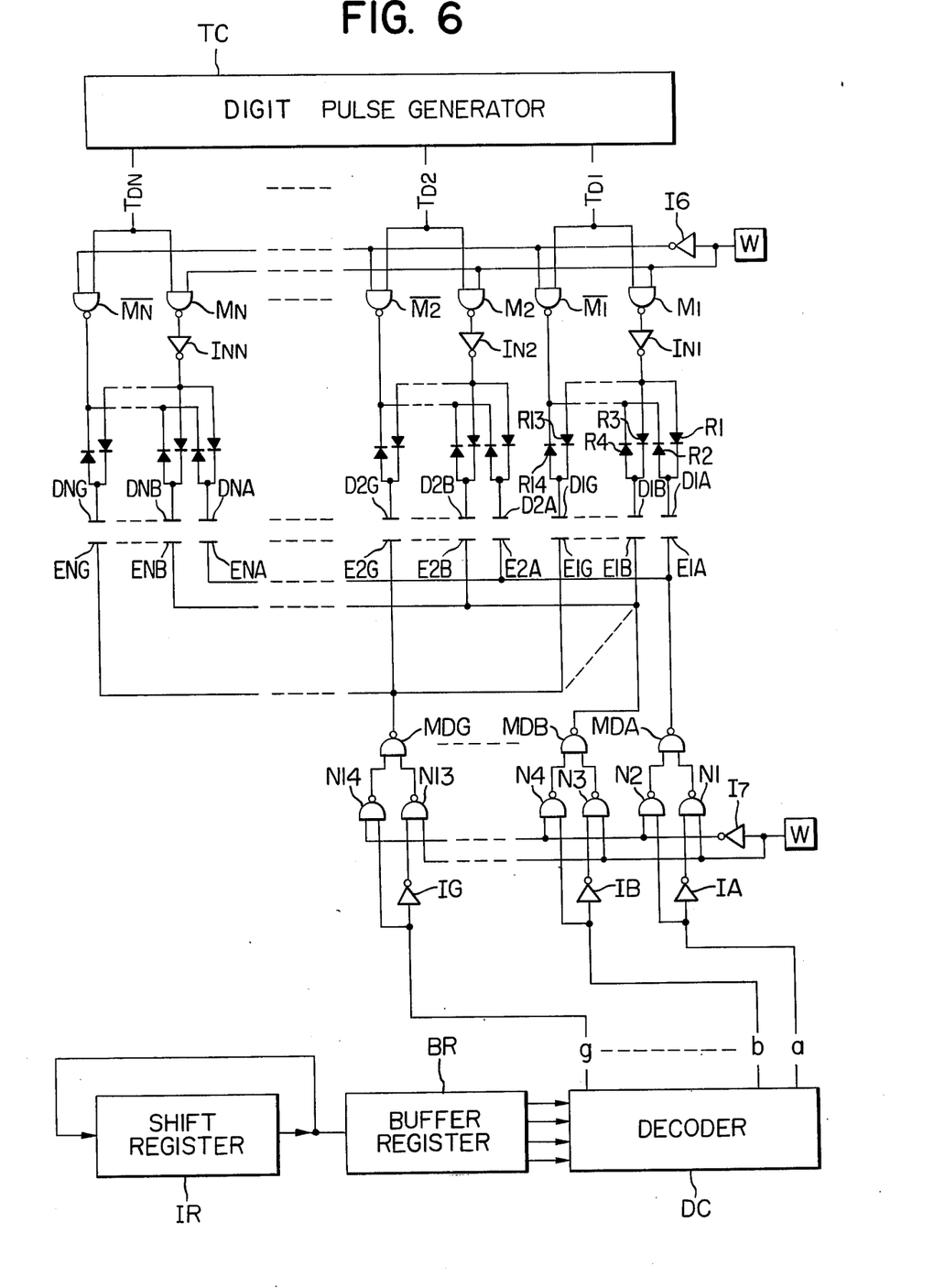
FIG. 6 shows an example of the driving circuit according to the present invention.
Figure 7:
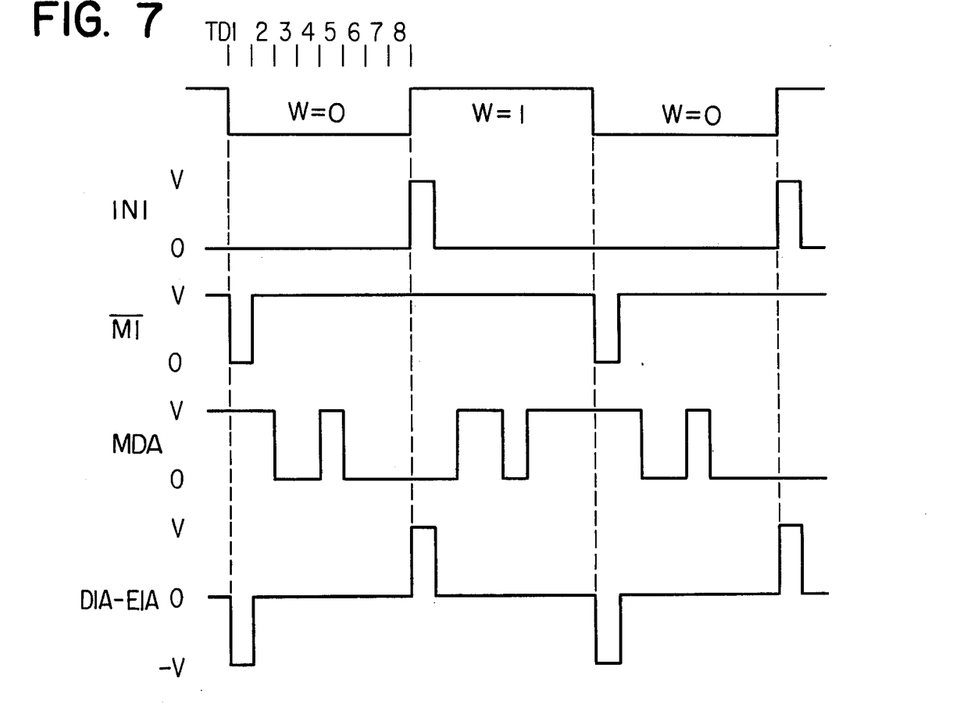
FIG. 7 illustrates the operation of the FIG. 6 circuit.

An embodiment of the present invention will now be described by reference to FIG. 6. Each digit electrode is formed into a configuration similar to that of the segment electrode as shown in FIG. 3. As seen in FIG. 6, a diode is connected to each digit electrode, and the anodes of diodes R1, R3, R5, ..., R13 are connected together at a common point while the cathodes of diodes R2, R4, R6, ..., R14 are connected together at a common point. The diodes so inserted can also prevent occurrence of crosstalk as shown in FIG. 1. Consider the case where, as in FIG. 2, $N=8$ and the segments $a$ of the first, second and fifth digits are selected. Then, the outputs of the NAND gates MDA and $\overline{M1}$ and inverter IN1 will be as shown below and as depicted in FIG. 7.

|  | Output of NAND gate MDA | |
|---|---|---|
|  | W = 0 | W = 1 |
| a = 0 | 0 volt | V |
| 1 | V volt | O |

|  | Output of inverter IN1 | |
|---|---|---|
|  | W = 0 | W = 1 |
| TD = 0 | O | O |
| 1 | O | V |

|  | Output of NAND gate $\overline{M1}$ | |
|---|---|---|
|  | W = 0 | W = 1 |
| TD1 = 0 | V | V |
| 1 | O | V |

Figure 8:
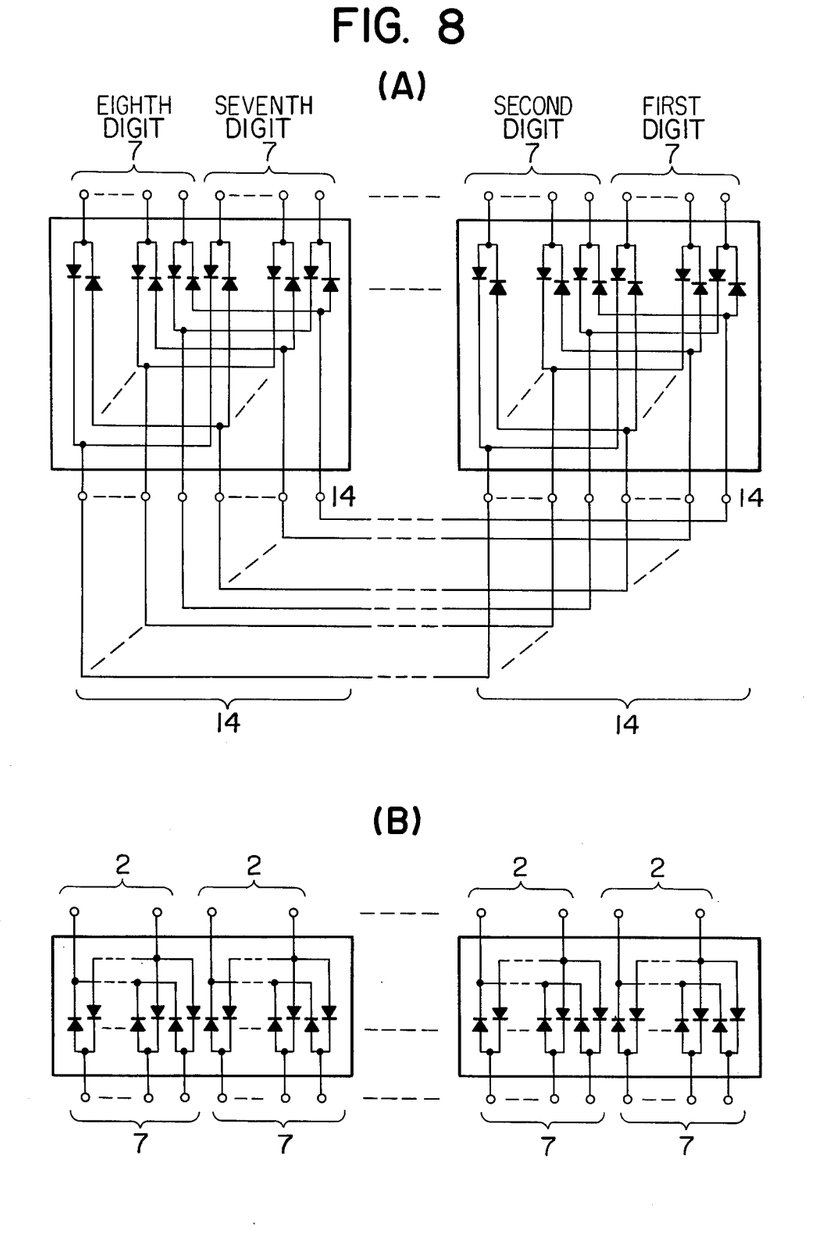

The outputs of NAND gates $\overline{M2}$, $\overline{M5}$ and inverters IN2, IN5 are varied as are the outputs of $\overline{M1}$ and IN1, respectively. It will be seen in FIG. 6 that when the output of the inverter IN1 is 0 volt, there is no voltage applied between digit electrode D1A and segment electrode E1A due to the presence of the inserted diode R1, even if the output of the NAND gate MDA is either 0 or V volts. Also, when the output of the NAND gate $\overline{M1}$ is V volts, there is no voltage applied between the electrodes D1A and E1A due to the presence of the inserted diode R2, even if the output of the NAND gate MDA is either 0 or V volts. A potential difference between the electrodes D1A and E1A does occur when the output of the inverter IN1 is V volts and the output of the NAND gate MDA is 0 volts or when the output of the NAND gate $\overline{M1}$ is 0 volts and the output of the NAND gate MDA is V volts. Accordingly, the voltage applied between the electrodes D1A and E1A will be as shown in FIG. 7. Thus, if in FIG. 2, $N=8$ and the diode array is formed into an integrated circuit for two digits each, the connections required will be as shown in FIG. 8A, wherein the number of pins in each IC is $7\times2+7\times2=28$ and the total number of pins is $28\times4>112$, which means that the printed board must be double-sided. In the case of FIG. 6, on the other hand, the connections required will be as shown in FIG. 8B, wherein the number of pins in each IC is $7\times2+2\times2=18$ and the total number of pins is only $18\times4=72$, which means that the printed board may be one-sided, and this leads to a greatly reduced number of the connections and, accordingly, a sharp enhancement in the reliability of calculators and displayers using the present invention.

While each column has been described as comprising seven segments, the same effect may also be obtained if the digit includes a segment for a decimal point.

Embodiment 2

Figure 10:
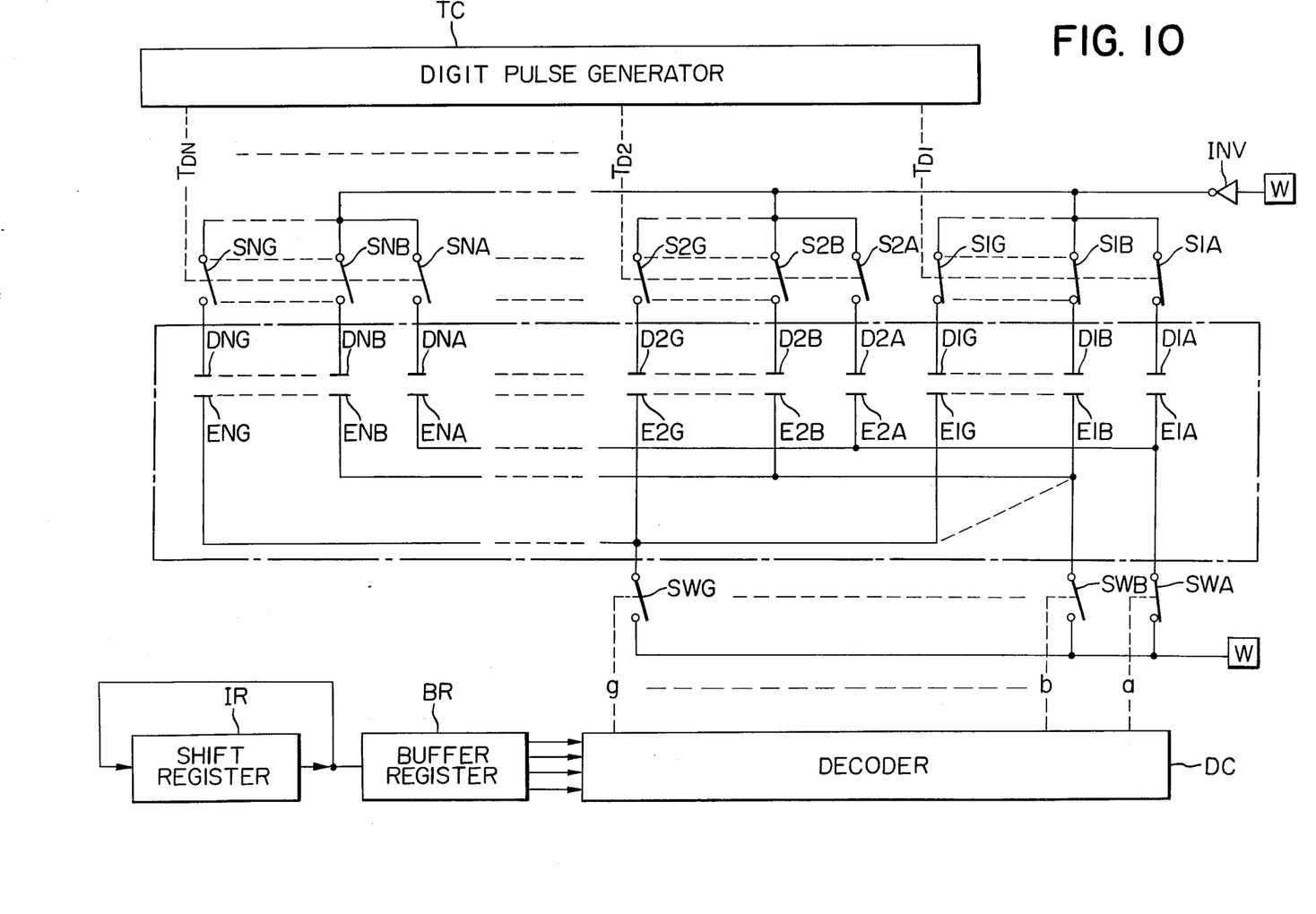
FIG. 10 shows another embodiment of the present invention.

In contrast with the conventional circuit as shown in FIG. 9A, consider a circuit as shown in FIG. 10. In FIGS. 9A and 10, encircled by a one-dot chain line is a displayer. In FIG. 9A, the matrix portion encircled by a two-dot chain line is connected outside a group of MOS transistors which in turn are connected to the segment electrodes E1A-E1G, and must therefore be constructed on the printed board. On the other hand, in FIG. 10, the matrix portion corresponding to that in FIG. 9A is directly connected to the segment electrodes.

Thus, the circuit arrangement of FIG. 9A imperatively necessitates the use of a double-sided printed board, whereas the circuit arrangement of FIG. 10 only requires the matrix portion to be formed on a glass substrate for liquid crystal or on a one-sided printed board. The formation of the matrix portion on such glass substrate may be accomplished as by a technique disclosed in Japanese Patent Application No. 78897/1973.

In FIG. 10, switch SWA is closed when a segment signal $a$ is produced. Likewise, the other switches SWB-SWG are respectively closed when segment signals $b$-$g$ are produced. Switches S1A-S1G, ..., SNA-SNG are respectively closed when signals TD1-TDN are produced. When signal TD1 is produced, the information within the register is decoded out to produce the segment signal $a$, whereupon switches S1A-S1G and SWA are closed so that a voltage is applied to the liquid crystal sandwiched between first digit electrode D1A and segment $a$ electrode E1A to thereby turn on the segment $a$. When W is "1", the output of the electrode D1A is 0 volts and the output of the electrode E1A is V volts, and when W is "0", the output of the electrode D1A is V volts and the output of the electrode E1A is 0 volts. Thus, the average time during which the voltage is applied is zero.

If the driving elements comprise MOS transistors as shown in FIG. 9B, there will be advantages in the formation of integrated circuits and in low power consumption.

Embodiment 3

In FIG. 10, MOS transistors S1A-S1G are simultaneously rendered conductive or non-conductive by the signal TD1, and when in the non-conductive state they are insulated from one another, but when in the conductive state they are connected together. The current flows bilaterally.

The MOS transistors S1A-S1G may be replaced by other elements which will be operable in a similar manner, for example, bilateral driving elements (hereinafter referred to as BDE) such as glass semiconductors, varistors or the like.

Figure 11:
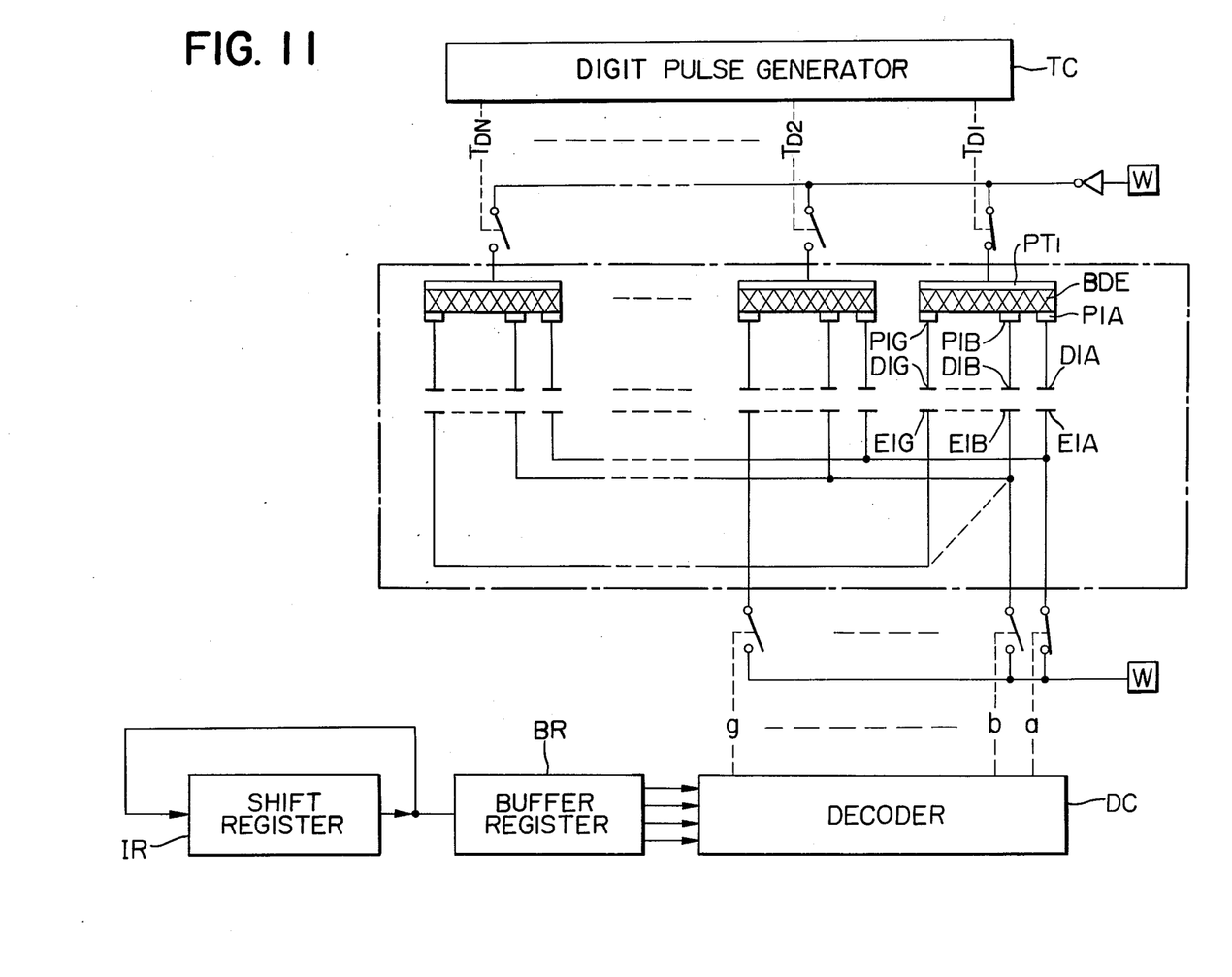
FIG. 11 shows still another embodiment of the present invention.

FIG. 11 shows a circuit in which the switches S1A-S1G and SNA-SNG are replaced by BDE's.

There has been a method of preventing crosstalk by sandwiching a glass semiconductor between electrodes, but this method has suffered from a great different between the holding current for holding the glass semiconductor in a conductive state, and the necesssary current for driving the liquid crystal. This has made it necessary to make operating conditions uniform by making some structural contrivance. Thus, the design has been complex and the manufacture difficult.

If, however, the driving elements are sandwiched between external electrodes in the manner as shown in FIG. 11, the areas of the external electrodes which are opposed to each other may be chosen as desired, so that the design for uniform operating conditions will be simplified and the manufacture will become easier.

Figure 12:
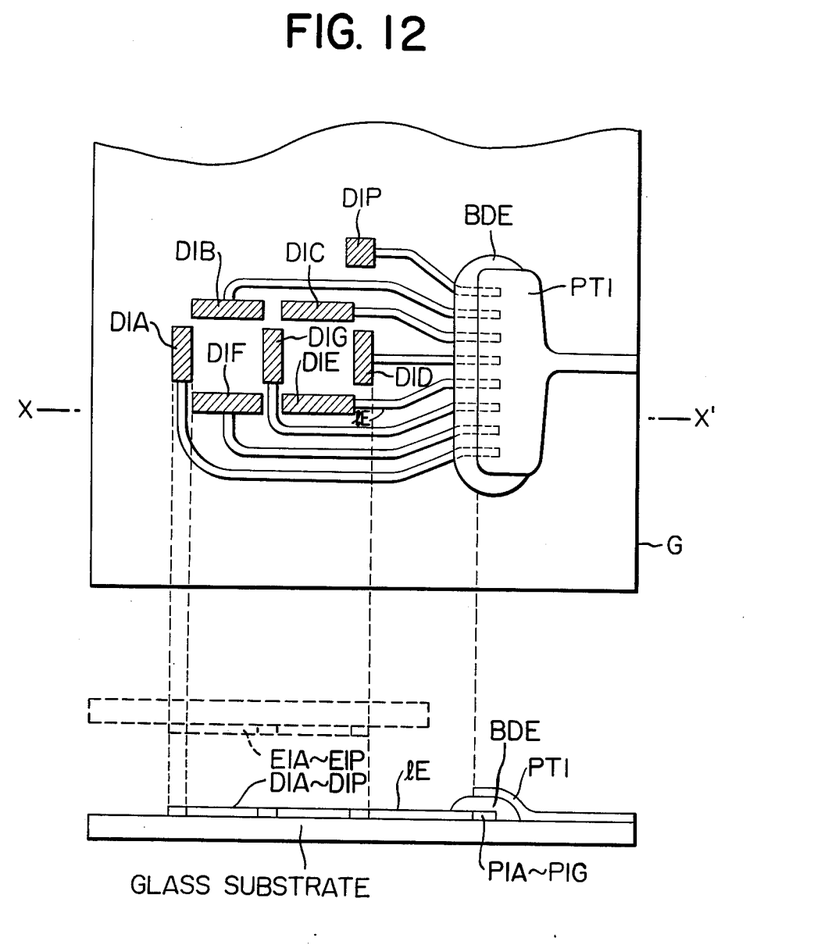
FIG. 12 shows the FIG. 11 displayer as embodied in a specific form.

Moreover, as shown in FIG. 12, BDE's may easily be mounted on the displayer.

Thus, all the circuit encircled by the one-dot chain line in FIG. 11 can be mounted on the displayer and this, as compared with FIG. 10, leads to a greatly reduced number of connections between the displayer and the printed board, say, $(8-1) \times N$, which in turn means greatly enhanced reliability.

Further, in this arrangement, the digit electrodes D1A–D1G are disposed in opposed relationship with the numeric electrodes E1A–E1G, and this can enhance the display contrast of the numeric characters.

What is claimed is:

1. A liquid crystal display device comprising:
   first register means for storing binary coded numeric information;
   second register means coupled to said first register means for sequentially storing single digits of the binary coded numeric information stored in said first register means;
   decoder means coupled to said second register means for converting the binary coded numeric information stored in said second register means into display information;
   a plurality of first electrodes disposed on a first plate for energization to define a plurality of digits each having a seven bar display format;
   a corresponding plurality of second electrodes disposed on a second plate which faces said first plate, each of said second electrodes corresponding, respectively, to ones of said first electrodes;
   a plurality of first driving elements coupled to said decoder means and being operative to energize each of said first electrodes in response to said decoder output;
   a plurality of second driving elements operative to energize each of said second electrodes;
   means coupled to said first and second driving elements for alternating the polarity of driving voltage applied between said pluralities of electrodes from said driving elements; and
   pulse generator means coupled to said second driving elements for sequentially selecting at least two electrodes of said second electrode so that only the electrodes corresponding to a particular portion of the display can be energized at a time.

2. A liquid crystal display device according to claim 1, wherein said segment electrodes defining said digits further comprise a segment electrode corresponding to a decimal point, and wherein said second plate further includes a digit electrode element corresponding to and arranged to oppose said decimal point segment electrode.

* * * * *

UNITED STATES PATENT OFFICE
CERTIFICATE OF CORRECTION

Patent No. 4,065,764      Dated December 27, 1977

Inventor(s) SAKAE HOURYU

It is certified that error appears in the above-identified patent and that said Letters Patent are hereby corrected as shown below:

Column 3, line 59, change ">" to read --=--.

Column 4, line 1, change "column" to read --digit--.

Column 4, line 64, change "different" to read --difference--.

Signed and Sealed this

Sixteenth Day of May 1978

[SEAL]

Attest:

RUTH C. MASON
Attesting Officer

LUTRELLE F. PARKER
Acting Commissioner of Patents and Trademarks